(12) United States Patent
Sinha et al.

(10) Patent No.: US 10,592,837 B2
(45) Date of Patent: Mar. 17, 2020

(54) IDENTIFYING SECURITY RISKS VIA ANALYSIS OF MULTI-LEVEL ANALYTICAL RECORDS

(71) Applicant: Accenture Global Solutions Limited, Dublin (IE)

(72) Inventors: Nishant Sinha, Bangalore (IN); Karol Sobiech, Düsseldorf (DE); Michaela Jungwirth, Vienna (AT); Oonagh O'Shea, Naas (IE); Robert Borer, Ratsch (AT); Arnab D. Chakraborty, Kronberg (DE)

(73) Assignee: Accenture Global Solutions Limited, Dublin (IE)

( * ) Notice: Subject to any disclaimer, the term of this patent is extended or adjusted under 35 U.S.C. 154(b) by 250 days.

(21) Appl. No.: 15/493,697

(22) Filed: Apr. 21, 2017

(65) Prior Publication Data
US 2018/0308026 A1 Oct. 25, 2018

(51) Int. Cl.
G06Q 10/06 (2012.01)
G06F 16/28 (2019.01)
G06F 21/55 (2013.01)
H04L 29/06 (2006.01)

(52) U.S. Cl.
CPC ....... *G06Q 10/0635* (2013.01); *G06F 16/288* (2019.01); *G06F 21/55* (2013.01); *H04L 63/1441* (2013.01)

(58) Field of Classification Search
CPC ......... H04L 29/06; G06F 21/55; G06F 16/28; G06Q 10/06
See application file for complete search history.

(56) References Cited

U.S. PATENT DOCUMENTS

| | | | | |
|---|---|---|---|---|
| 6,223,143 B1 * | 4/2001 | Weinstock | ......... | G06Q 10/0635 703/17 |
| 6,912,502 B1 * | 6/2005 | Buddle | ................. | G06Q 10/10 705/7.41 |
| 7,698,148 B2 * | 4/2010 | Lavu | .................. | G06Q 10/0635 705/1.1 |

(Continued)

OTHER PUBLICATIONS

Recruit Emerging Skills in Changing Markets—CEB TalentNeuron CEB, 2016 (Year: 2016).*

(Continued)

*Primary Examiner* — Scott L Jarrett
(74) *Attorney, Agent, or Firm* — Harrity & Harrity, LLP

(57) ABSTRACT

A device may receive, from sources, data objects identifying values relating to entities for which a risk indicator is to be determined, and may process the data objects to generate an analytical record that identifies relationships between values of different data objects. The device may determine, based on the analytical record, the risk indicator corresponding to one or more entities. The risk indicator may be determined based on at least one of: a comparison between the analytical record and a data structure that identifies expected values of one or more of the data objects; an identification of a group of the entities, and an outlier from the group of the entities based on the analytical record; or an identification of a change in behavior of the one or more entities based on the analytical record. The device may perform an action based on determining the risk indicator.

20 Claims, 5 Drawing Sheets

(56) References Cited

U.S. PATENT DOCUMENTS

| | | | |
|---|---|---|---|
| 7,865,958 B2 * | 1/2011 | Lieblich | G06F 21/316 708/135 |
| 7,873,566 B1 * | 1/2011 | Templeton | G06Q 20/042 705/35 |
| 7,873,567 B2 * | 1/2011 | Eder | G06Q 40/00 705/35 |
| 7,895,448 B1 * | 2/2011 | Satish | G06F 21/577 713/187 |
| 8,132,260 B1 * | 3/2012 | Mayer | G06F 21/577 726/11 |
| 8,402,546 B2 * | 3/2013 | Greenshpon | H04L 63/1433 706/52 |
| 8,478,708 B1 * | 7/2013 | Larcom | G06Q 10/10 706/52 |
| 8,726,379 B1 * | 5/2014 | Stiansen | H04L 63/1491 726/22 |
| 9,154,516 B1 * | 10/2015 | Vaystikh | H04L 63/1425 |
| 9,177,279 B2 * | 11/2015 | Miller | G06Q 10/0635 |
| 9,582,780 B1 * | 2/2017 | Curcic | G06Q 10/0635 |
| 9,661,013 B2 * | 5/2017 | Reno | H04L 63/1433 |
| 9,798,883 B1 * | 10/2017 | Gil | G06F 21/577 |
| 9,811,794 B2 * | 11/2017 | Mun | G06Q 10/04 |
| 10,003,607 B1 * | 6/2018 | Kolman | H04L 63/0272 |
| 10,015,185 B1 * | 7/2018 | Kolman | H04L 63/1425 |
| 10,044,745 B1 * | 8/2018 | Jones | H04L 63/107 |
| 10,095,866 B2 * | 10/2018 | Gong | G06F 21/577 |
| 10,223,760 B2 * | 3/2019 | Ananthanpillai | G06Q 50/265 |
| 10,230,746 B2 * | 3/2019 | Visbal | H04L 63/1441 |
| 10,270,795 B2 * | 4/2019 | DiValentin | G06Q 10/0635 |
| 10,432,605 B1 * | 10/2019 | Lester | H04L 63/08 |
| 2003/0120589 A1 * | 6/2003 | Williams | G06Q 10/0635 705/38 |
| 2004/0030628 A1 * | 2/2004 | Takamoto | G06Q 40/06 705/36 R |
| 2004/0230835 A1 * | 11/2004 | Goldfeder | G06F 21/51 726/23 |
| 2005/0065754 A1 * | 3/2005 | Schaf | G06Q 10/0635 702/188 |
| 2005/0096953 A1 * | 5/2005 | Washington | G06Q 10/06 705/7.28 |
| 2005/0137932 A1 * | 6/2005 | D'Angelo | G06Q 10/06 705/7.28 |
| 2005/0228622 A1 * | 10/2005 | Jacobi | G06Q 40/08 703/2 |
| 2006/0100957 A1 * | 5/2006 | Buttler | G06Q 40/025 705/38 |
| 2007/0038587 A1 * | 2/2007 | Watanabe | G06N 20/00 706/21 |
| 2007/0219820 A1 * | 9/2007 | Busch | G06Q 10/10 705/35 |
| 2007/0271198 A1 * | 11/2007 | Del Bianco | G06Q 10/06 705/36 R |
| 2009/0164276 A1 * | 6/2009 | Sass | G06Q 10/00 705/7.28 |
| 2009/0248465 A1 * | 10/2009 | Recce | G06Q 40/00 705/38 |
| 2009/0248559 A1 * | 10/2009 | Recce | G06Q 20/04 705/35 |
| 2009/0248560 A1 * | 10/2009 | Recce | G06Q 20/04 705/35 |
| 2009/0293121 A1 * | 11/2009 | Bigus | G06F 21/316 726/22 |
| 2010/0049565 A1 * | 2/2010 | Aebig | G06F 17/246 705/7.28 |
| 2010/0156630 A1 * | 6/2010 | Ainsbury | G07C 9/00103 340/540 |
| 2010/0306850 A1 * | 12/2010 | Barile | G06F 21/566 726/25 |
| 2011/0047114 A1 * | 2/2011 | Marvell | G06Q 10/06 706/46 |
| 2011/0126111 A1 * | 5/2011 | Gill | G06F 21/55 715/736 |
| 2011/0131131 A1 * | 6/2011 | Griffin | G06Q 40/00 705/38 |
| 2011/0131658 A1 * | 6/2011 | Bahl | G06F 21/577 726/25 |
| 2011/0137686 A1 * | 6/2011 | Mott | G06Q 40/04 705/4 |
| 2011/0265162 A1 * | 10/2011 | Alavandar | G06Q 99/00 726/7 |
| 2011/0288692 A1 * | 11/2011 | Scott | G06F 21/55 700/297 |
| 2012/0030076 A1 * | 2/2012 | Checco | G06Q 40/00 705/31 |
| 2012/0209760 A1 * | 8/2012 | McCarthy | G06Q 40/025 705/38 |
| 2013/0179215 A1 * | 7/2013 | Foster | G06Q 10/00 705/7.28 |
| 2013/0197942 A1 * | 8/2013 | Chiu | G06Q 50/22 705/3 |
| 2013/0298192 A1 * | 11/2013 | Kumar | G06F 21/52 726/3 |
| 2013/0305356 A1 * | 11/2013 | Cohen-Ganor | G06Q 40/00 726/22 |
| 2014/0172417 A1 * | 6/2014 | Monk, II | G06F 17/2785 704/9 |
| 2014/0173737 A1 * | 6/2014 | Toback | G06F 21/577 726/25 |
| 2014/0188442 A1 * | 7/2014 | Zelenka | G06F 17/5009 703/2 |
| 2014/0279641 A1 * | 9/2014 | Singh | G06Q 50/265 705/325 |
| 2015/0089300 A1 * | 3/2015 | Tejerina | G06F 11/3476 714/45 |
| 2015/0229664 A1 * | 8/2015 | Hawthorn | H04L 63/1433 726/25 |
| 2015/0309918 A1 * | 10/2015 | Raghavan | G06F 11/3688 714/38.1 |
| 2015/0347698 A1 * | 12/2015 | Soni | G06N 5/047 706/11 |
| 2015/0356477 A1 * | 12/2015 | Milkman | G06Q 10/0633 705/7.27 |
| 2015/0373043 A1 * | 12/2015 | Wang | G06F 21/552 706/12 |
| 2016/0155350 A1 * | 6/2016 | Dragicevic | G09B 7/00 434/236 |
| 2016/0182556 A1 * | 6/2016 | Tatourian | G06F 21/554 726/25 |
| 2016/0226905 A1 * | 8/2016 | Baikalov | H04L 63/1408 |
| 2016/0247227 A1 * | 8/2016 | Dalal | G06Q 40/04 |
| 2016/0307199 A1 * | 10/2016 | Patel | G06Q 20/4016 |
| 2017/0078322 A1 * | 3/2017 | Seiver | H04L 43/0876 |
| 2017/0213037 A1 * | 7/2017 | Toledano | G06F 21/552 |
| 2017/0230402 A1 * | 8/2017 | Greenspan | H04L 63/1433 |
| 2017/0244746 A1 * | 8/2017 | Hawthorn | H04L 63/1433 |
| 2017/0286671 A1 * | 10/2017 | Chari | G06F 21/552 |
| 2017/0353483 A1 * | 12/2017 | Weith | H04L 63/1433 |
| 2018/0005315 A1 * | 1/2018 | Rines | G06Q 30/0185 |
| 2018/0068241 A1 * | 3/2018 | Varkey | G06Q 10/0635 |
| 2018/0234448 A1 * | 8/2018 | DiValentin | G06Q 10/0635 |

OTHER PUBLICATIONS

Wowczko, Izabela A., Skills and Vacancy Analysis with Data Mining Techniques Informatics, vol. 2, 2015 (Year: 2015).*

* cited by examiner

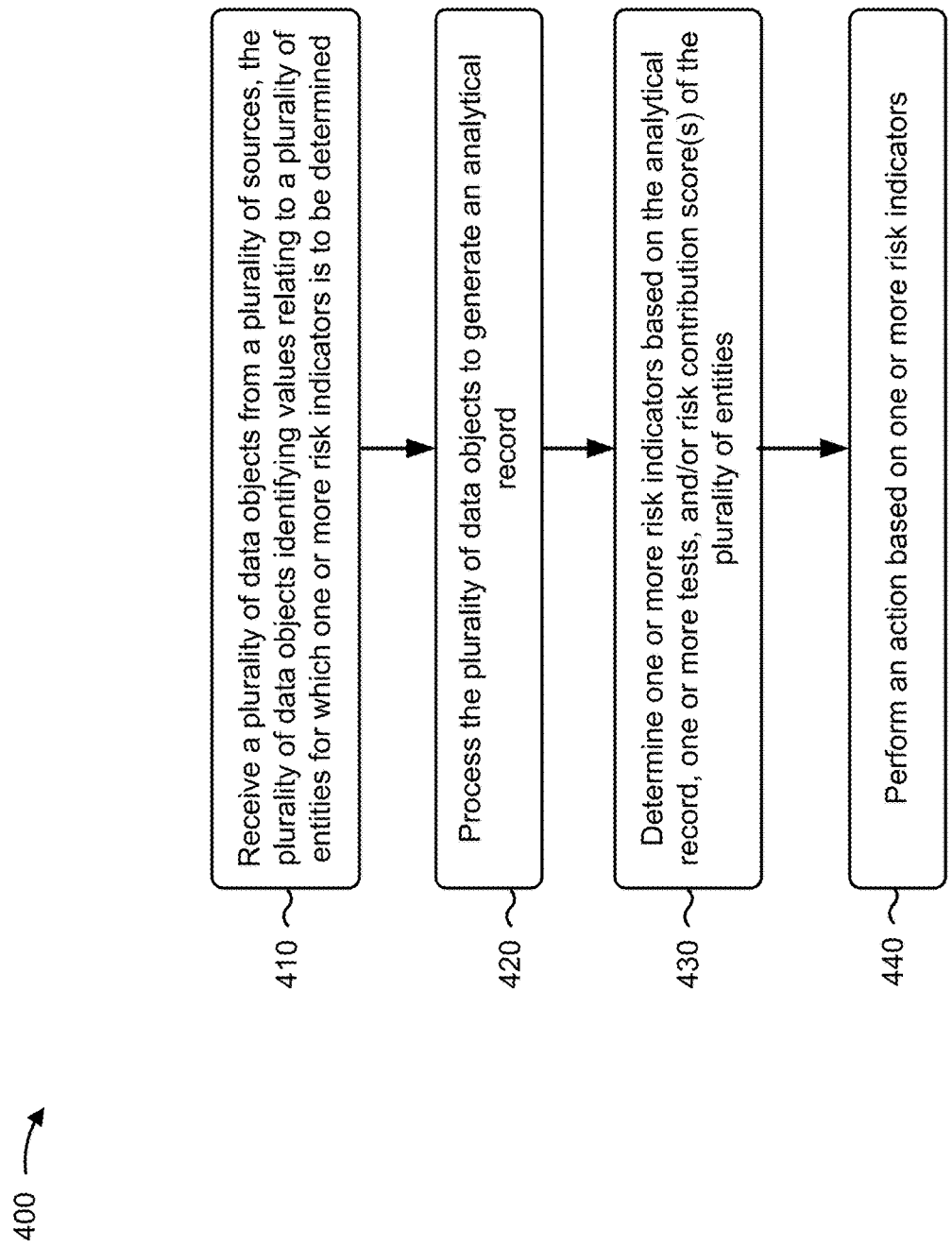

IDENTIFYING SECURITY RISKS VIA ANALYSIS OF MULTI-LEVEL ANALYTICAL RECORDS

BACKGROUND

A system may include various entities (e.g., workers, devices, etc.) that perform functions associated with the system. For example, a computer system may include various devices that perform respective functions based on configurations of the various devices. As another example, a medical care system may include practitioners, nurses, pharmacies, medical equipment, and so on. Different entities may be associated with different risks, which may be based on configuration of the entities, behavior of the entities, training of the entities, operating conditions of the entities, or the like.

SUMMARY

According to some possible implementations, one or more devices may include one or more processors to: receive a plurality of data objects from a plurality of sources, where the plurality of data objects may identify values relating to a plurality of entities for which a risk indicator is to be determined; process the plurality of data objects to generate an analytical record, where the analytical record may identify relationships between respective values of different data objects of the plurality of data objects; determine the risk indicator based on the analytical record, where the risk indicator may correspond to one or more entities of the plurality of entities, and where the risk indicator may be determined based on one or more tests including at least one of: a comparison between the analytical record and a data structure that identifies expected values of one or more data objects of the plurality of data objects, an identification of a group of entities, of the plurality of entities, and an outlier from the group of entities based on the analytical record, or an identification of a change in behavior of the one or more entities based on the analytical record; and perform an action based on determining the risk indicator.

According to some possible implementations, a method may include: receiving, by a device, a plurality of data objects from a plurality of sources, where the plurality of data objects may identify values relating to a plurality of entities for which a risk indicator is to be determined; processing, by the device, the plurality of data objects to generate an analytical record, where the analytical record may identify relationships between respective values of different data objects of the plurality of data objects; determining, by the device, the risk indicator based on the analytical record, where the risk indicator may identify a probability of occurrence of a condition with regard to one or more entities of the plurality of entities, and where the risk indicator may be determined based on one or more tests including at least one of: a comparison between the analytical record and a data structure that identifies expected values of one or more data objects of the plurality of data objects, an identification of a group of entities, of the plurality of entities, and an outlier from the group of entities based on the analytical record, or an identification of a change in behavior of the one or more entities based on the analytical record; and automatically performing, by the device, an action with regard to the one or more entities based on determining the risk indicator.

According to some possible implementations, a non-transitory computer-readable medium may store instructions that, when executed by one or more processors, cause the one or more processors to: receive a plurality of data objects from a plurality of sources, where the plurality of data objects may identify values relating to a plurality of entities for which a risk indicator is to be determined; process the plurality of data objects to generate an analytical record, where the analytical record may identify relationships between respective values of different data objects of the plurality of data objects; determine the risk indicator based on the analytical record, where the risk indicator may identify a probability of occurrence of a condition with regard to one or more entities of the plurality of entities, and where the risk indicator may be determined based on one or more tests including at least one of: a comparison between the analytical record and a data structure that identifies expected values of one or more objects of the plurality of data objects, an identification of a group of entities, of the plurality of entities, and an outlier from the group of entities based on the analytical record, or an identification of a change in behavior of the one or more entities based on the analytical record; and automatically perform an action with regard to the one or more entities based on determining the risk indicator.

BRIEF DESCRIPTION OF THE DRAWINGS

FIG. 4 is a flow chart of an example process for identifying hidden fraudulent patterns on a multi-level network structure.

DETAILED DESCRIPTION

The following detailed description of example implementations refers to the accompanying drawings. The same reference numbers in different drawings may identify the same or similar elements.

A system may include several entities. An entity may include a human, such as a worker, an employee, a practitioner, or the like. Additionally, an entity may include a device, a component, an application, a sub-system, or the like. Examples of systems may include a health care system (e.g., a hospital, a group of hospitals, a doctor's office, or the like), a computer system or network, an insurance system (e.g., car owners, insurance adjusters, service providers, etc.), or the like.

A system may be associated with some degree of risk. In some cases, the risk may be caused by behavior or actions of an entity included in the system. For example, a human entity may engage in fraudulent, deceptive, or risky behavior. As another example, a device in a computer system may be configured in an insecure manner. Different risky behaviors may manifest in different ways and/or may include many different entities, and information that might be used to identify risk may be in an unstructured or cumbersome format.

Implementations described herein determine a risk indicator associated with a risk (e.g., fraud, malfunction, security breach, etc.) for one or more entities of a system based on data objects associated with the one or more entities. Implementations described herein may process the data objects to generate a multi-level analytical record that identifies relationships between entities of the system and values of data associated with the entities. Further, implementations described herein may determine the risk indicator based on risk contribution scores of other entities that have relationships with the one or more entities, which improves accuracy of the risk indicator. The risk indicator and/or risk contribution scores may be determined based on performing one or more tests, such as a break point analysis, a peer group analysis, a regression analysis, a decision tree analysis, or the like.

In this way, a risk indicator is determined based on a multi-level analytical record and based on relationships between entities, which may enable identification of patterns of risky behavior between multiple, different entities. Further, the analytical record may be generated based on various big data analytical approaches, which may permit processing of large volumes of data in a fashion that may be difficult or impossible for a human actor. Still further, implementations described herein may determine the risk indicator using one or more unsupervised tests (e.g., break point analysis, peer group analysis, etc.), which may not require human supervision and may not require calibration or configuration using historical data.

Figure 1A:
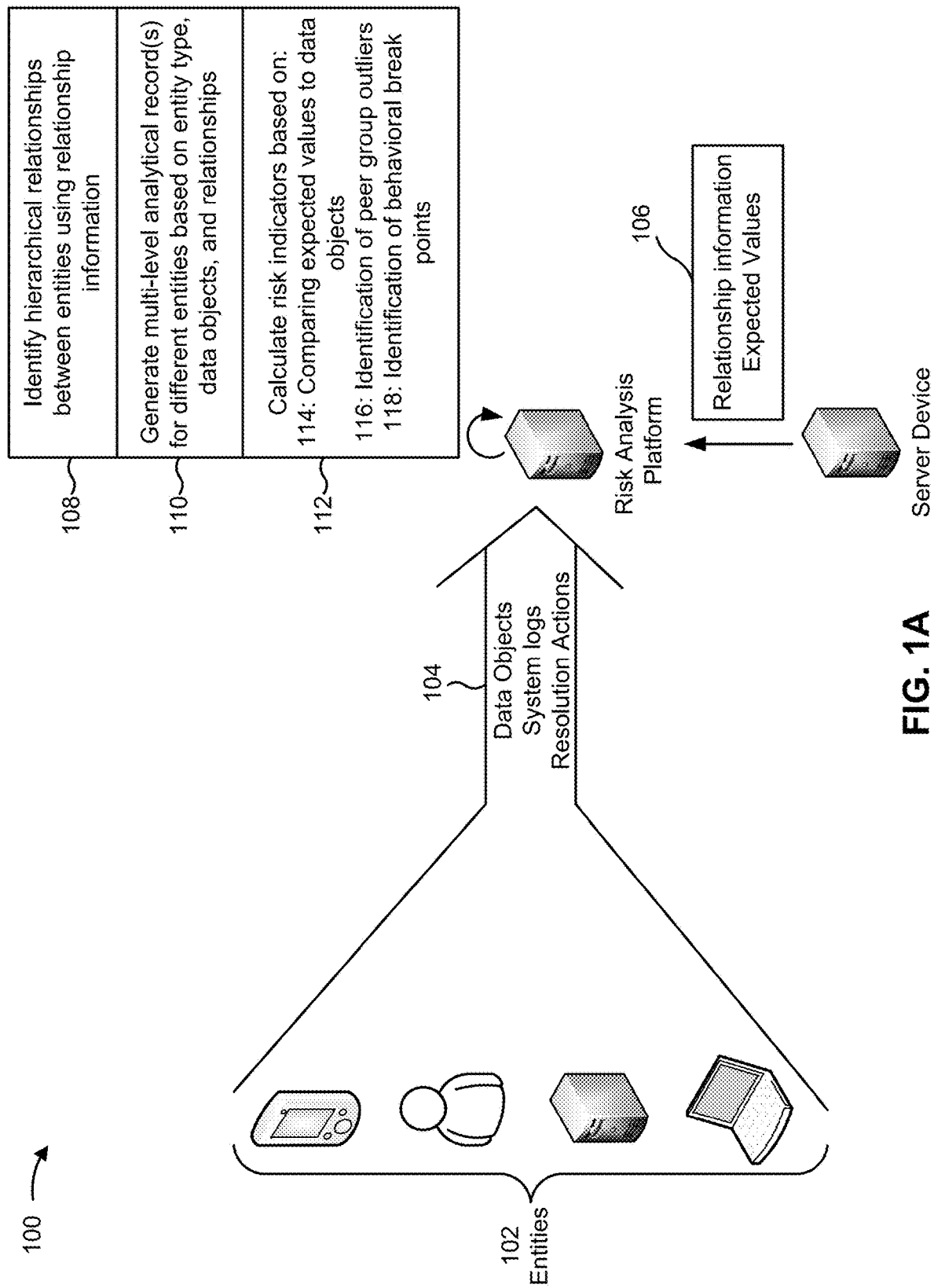
FIGS. 1A and 1B are diagrams of an overview of an example implementation described herein.
Figure 1B:
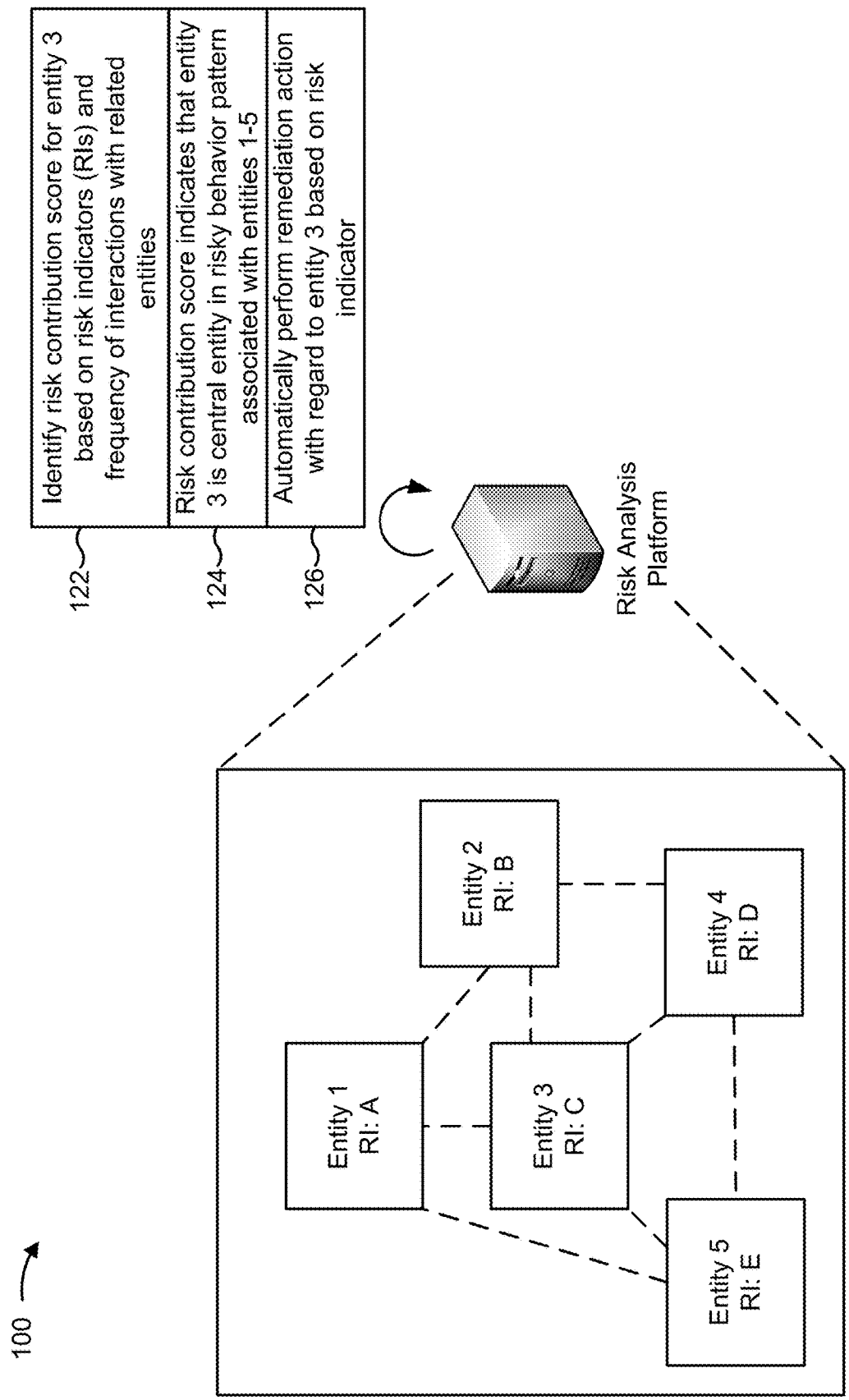

FIGS. 1A and 1B are diagrams of an overview of an example implementation 100 described herein.

As shown in FIG. 1A, a set of entities 102 may provide data objects to a risk analysis platform. The entities may include, for example, human beings, user devices, servers, applications, and/or the like, as described in more detail elsewhere herein. As shown by reference number 104, the data objects may include system logs, resolution actions (e.g., actions taken to resolve a prior issue), and/or the like. In some implementations, the data objects may include other information, as described in more elsewhere herein. As shown by reference number 106, a server device may provide relationship information and expected values to the risk analysis platform. The relationship information may include relationship information identifying preexisting relationships between entities 102 and the data objects. The expected values may be expected values associated with the data objects (e.g., for comparison to determine whether a data object deviates from an expected value).

As shown by reference number 108, the risk analysis platform may identify hierarchical relationships between entities 102 using the relationship information received from the server device. For example, a first device that provides particular information to a second device may be associated with a hierarchical relationship to the second device. As another example, a first person that supervises a second person may be associated with a hierarchical relationship to the second person. As a third example, a patient of a particular doctor may share a hierarchical relationship with the particular doctor. The risk analysis platform may identify hierarchical levels associated with entities (e.g., based on received information identifying the hierarchical levels and/or information associated with the entities).

As shown by reference number 110, the risk analysis platform may generate one or more multi-level analytical records for different entities 102 based on types of the entities 102, data objects received from the entities 102, and one or more relationships between entities 102 (e.g., the hierarchical relationships and/or other relationships). An analytical record may identify values of the data objects, and may identify connections between values, data objects, and/or entities. For example, when two entities are linked by a hierarchical relationship, the analytical record may store information identifying an association between data objects relating to the two entities. In some implementations, the analytical record may be generated based on entity types. For example, entities of a particular type may be grouped, and the analytical record may identify relationships between data objects relating to the entities of the particular type.

As shown by reference number 112, the risk analysis platform may calculate risk indicators of the entities 102. As shown by reference number 114, the risk analysis platform may calculate the risk indicators based on comparing expected values associated with the data objects to the values of the data objects. For example, when a data object deviates from an expected value, a corresponding entity may be associated with increased risk and, therefore, a higher risk indicator. Additionally, or alternatively, and as shown by reference number 116, the risk analysis platform may determine the risk indicators based on identifying peer group outliers. For example, the risk analysis platform may assign a higher risk indicator to an entity that is an outlier with regard to a value associated with a set of entities (e.g., a set of entities of the same type, a set of entities associated with hierarchical relationships to each other, etc.). Additionally, or alternatively, and as shown by reference number 118, the risk analysis platform may identify behavioral break points. For example, when a value or behavior of an entity changes from an expected value or behavior (e.g., based on a change in a behavior of the entity, a change in an output of the entity, etc.), the risk analysis platform may identify a behavioral break point, and may thereby increase a value of a risk indicator associated with the entity.

FIG. 1B shows an example of determining a risk contribution score for an entity based on a risk indicator of the entity and/or risk indicators of related entities. A risk contribution score identifies a level of involvement or risk that is associated with an entity with regard to a group of entities associated with a risk. For example, an entity that is a ringleader of a group perpetrating fraud may be associated with a higher risk contribution score than an entity that is less involved in the group.

As shown in FIG. 1B, assume that the risk analysis platform determines risk indicators associated with five entities (e.g., entity 1, entity 2, entity 3, entity 4, and entity 5). For example, the risk indicator associated with entity 1 may have a value of A, the risk indicator associated with entity 2 may have a value of B, the risk indicator associated with entity 3 may have a value of C, the risk indicator associated with entity 4 may have a value of D, and the risk indicator associated with entity 5 may have a value of E. As further shown, entity 3 may be associated with entities 1, 2, 4, and 5 (shown by dotted lines). For example, the risk analysis platform may store information identifying relationships between the entities and/or information identifying interactions between entities.

As shown by reference number 122, the risk analysis platform may identify a risk contribution score for entity 3 based on the risk indicators of the entities associated with entity 3, and a frequency of interactions of entity 3 with other entities (e.g., interactions with entity 1, entity 2, entity 4, and/or entity 5). For example, the risk analysis platform may increase the risk contribution score of entity 3 when entity 3 is associated with a threshold quantity of interactions with an entity associated with a threshold risk indicator, as described in more detail elsewhere herein. In some aspects, the risk analysis platform may determine the risk contribution score of entity 3 based on respective scores of entities 1, 2, 4, and/or 5, as also described herein. By identifying a risk indicator and risk contribution score for entity 3 using respective risk indicators and risk contribution scores of related entities, the risk analysis platform enables identification of groups of entities associated with a particular risk or activity.

As shown by reference number 124, the risk analysis platform may determine that a risk contribution score of entity 3 indicates that entity 3 is a central entity in a risky behavior pattern associated with the entities 1 through 5. In other words, the risk analysis platform may determine that entity 3 is associated with a most critical security vulnerability of the entities of the group, organizing the group, providing malicious content or traffic to other entities of the group, contributing to the group, performing the most transactions of entities in the group, and/or the like. In some implementations, the risk analysis platform may determine that entity 3 is the central entity based on the risk contribution score associated with entity 3 satisfying a threshold, based on the risk contribution score associated with entity 3 being the highest risk contribution score of entities 1 through 5, based on the risk contribution score associated with entity 3 being higher than the risk contribution scores of entities 1, 2, 4, and 5 by at least a threshold amount, and/or the like.

As shown by reference number 126, the risk analysis platform may automatically perform a remediation action with regard to entity 3 based on the risk indicator and/or the risk contribution score for entity 3. For example, in an information technology (IT) context, the risk analysis platform may deactivate entity 3, perform a security process with regard to entity 3, automatically reconfigure entity 3, notify an administrator, block entities 1, 2, 4, and/or 5 from interacting with entity 3, and/or the like. In some implementations, the risk analysis platform may perform another type of action, as described in more detail elsewhere herein.

In this way, the risk analysis platform may determine a risk indicator based on a multi-level analytical record and based on relationships between entities 102, which may enable identification of patterns of risky behavior between multiple, different entities 102. Further, the risk analysis platform may generate an analytical record based on various big data analytical approaches, which may permit processing of large volumes of data (e.g., millions, billions, trillions, etc. of data items) in a fashion that may be difficult or impossible for a human actor. Still further, risk analysis platform may determine the risk indicator using one or more unsupervised tests (e.g., break point analysis, peer group analysis, etc.), which may not require human supervision and may not require calibration or configuration using historical data.

As indicated above, FIGS. 1A and 1B are provided merely as an example. Other examples are possible and may differ from what was described with regard to FIGS. 1A and 1B.

Figure 2:
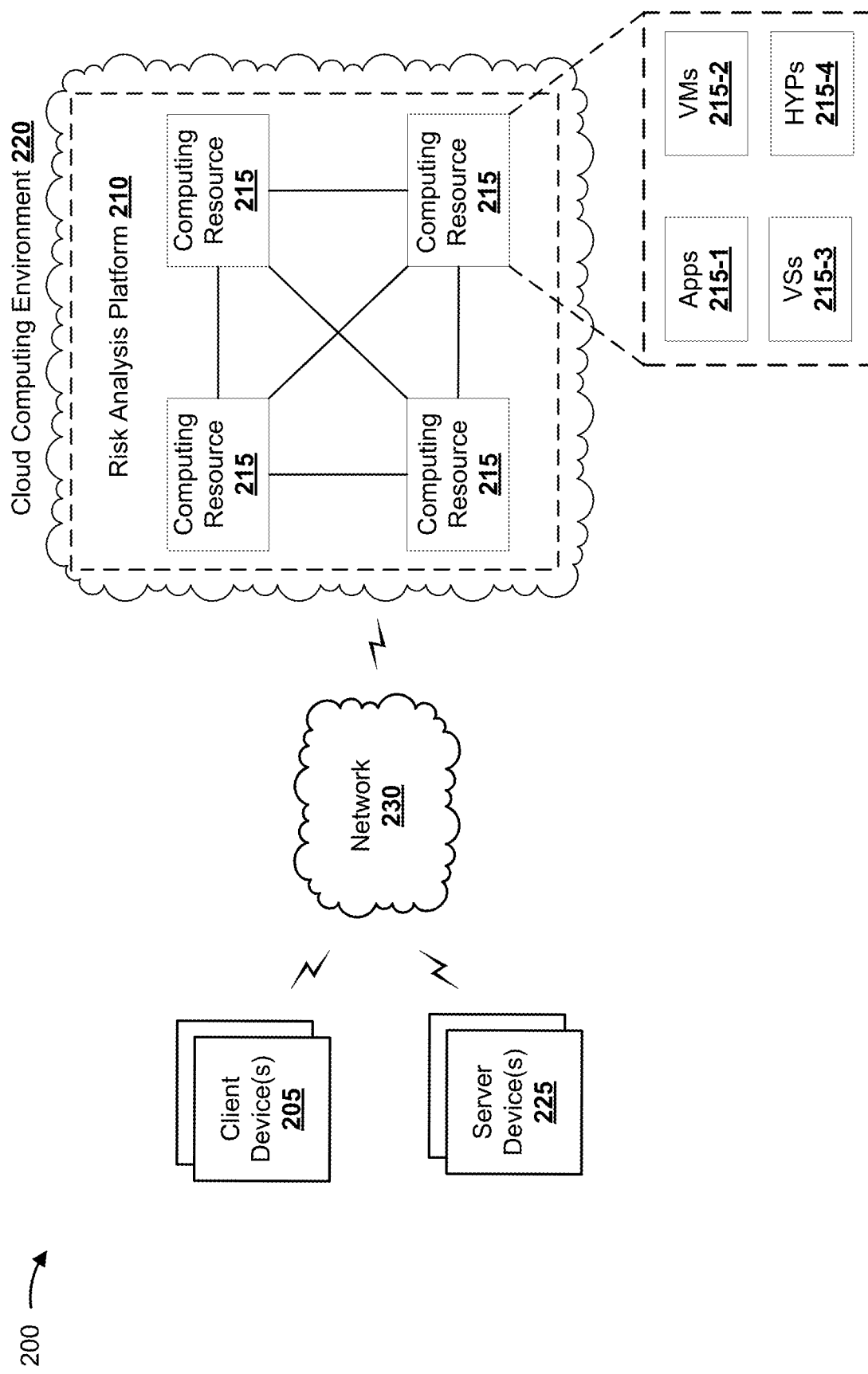
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include client device 205, risk analysis platform 210 hosted within cloud computing environment 220, server device 225, and a network 230. Devices of environment 200 may interconnect via wired connections, wireless connections, or a combination of wired and wireless connections.

Client device 205 includes one or more devices capable of receiving, generating, storing, processing, and/or providing information, such as information associated with an entity. For example, client device 205 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Risk analysis platform 210 includes one or more devices capable of determining risk indicators and/or risk contribution scores for a set of entities based on data objects associated with the set of entities. In some implementations, risk analysis platform 210 may be capable of extracting and processing data from streaming data sources and batch data sources using big data tools. In some implementations, risk analysis platform 210 may include one or more bulk data sources (e.g., batch/file data sources), streaming data sources (e.g., Kafka), analytics engines (e.g., Apache Spark, Oracle R, or the like), data lakes (e.g., Hadoop Distributed File System (HDFS)/Hbase/Impala), data warehouses (DWH)/relational database management systems (RDBMS), application programming interfaces (API) (e.g., data abstraction layers), and/or visualization layers (e.g., dashboards). A data lake may be capable of extracting and processing bulk data from a bulk data source and streaming data from a streaming data source. The data lake also may be capable of storing data objects associated with the bulk data and the streaming data. The data lake also may be capable of providing the processed data to a DWH/RDBMS, which may serve as a central store for the data objects. The data lake also may be capable of providing the processed data to an analytics engine, which may perform distributed calculation and handling of the data from the bulk data source, data from the streaming data source, data objects from the data lake, and/or data from the DWH/RDBMS. The data lake and the DWH/RDBMS also may be capable of providing data to an API, which may be used to provide routines, protocols, and tools for programming a visualization layer for users of risk analysis platform 210.

In some implementations, as shown, risk analysis platform 210 may be hosted in cloud computing environment 220. Notably, while implementations described herein describe risk analysis platform 210 as being hosted in cloud computing environment 220, in some implementations, risk analysis platform 210 may not be cloud-based (i.e., may be implemented outside of a cloud computing environment) or may be partially cloud-based.

Cloud computing environment 220 includes an environment that delivers computing as a service, whereby shared resources, services, etc. may be provided to client device 205, network 230, and/or server device 225. Cloud computing environment 220 may provide computation, software, data access, storage, and/or other services that do not require end-user knowledge of a physical location and configuration of a system and/or a device that delivers the services. As shown, cloud computing environment 220 may include risk analysis platform 210, computing resource 215, Apps 215-1, VMs 215-2, VSs 215-3, and HYPs 215-4.

Computing resource 215 includes one or more personal computers, workstation computers, server devices, or another type of computation and/or communication device. In some implementations, computing resource 215 may include or be a part of risk analysis platform 210. The cloud resources may include compute instances executing in computing resource 215, storage devices provided in computing resource 215, data transfer devices provided by computing resource 215, etc. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by client device 205. Application 215-1 may eliminate a need to install and execute the software applications on client device 205. For example, application 215-1 may include software associated with risk analysis platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system ("OS"). A process virtual machine may execute a single program, and may support a single process. In some implementations, virtual machine 215-2 may execute on behalf of a user (e.g., client device 205), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems, and may manage the execution of the guest operating systems. Multiple instances of a variety of operating systems may share virtualized hardware resources.

Server device 225 includes one or more devices, accessible through network 230, that are sources of information that may be used by risk analysis platform 210. For example, server device 225 may include a server that includes particular information for use by risk analysis platform 210. For example, server device 225 may include a server or a group of servers (e.g., a cloud-based server, an application device, a content server, a host server, a web server, a database server, a data center server, etc.), a desktop computer, or a similar device. In some implementations, a set of server devices 225 may be associated with one or more entities.

Network 230 includes one or more wired and/or wireless networks. For example, network 230 may include a cellular network (e.g., a long-term evolution (LTE) network, a code division multiple access (CDMA) network, a 3G network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
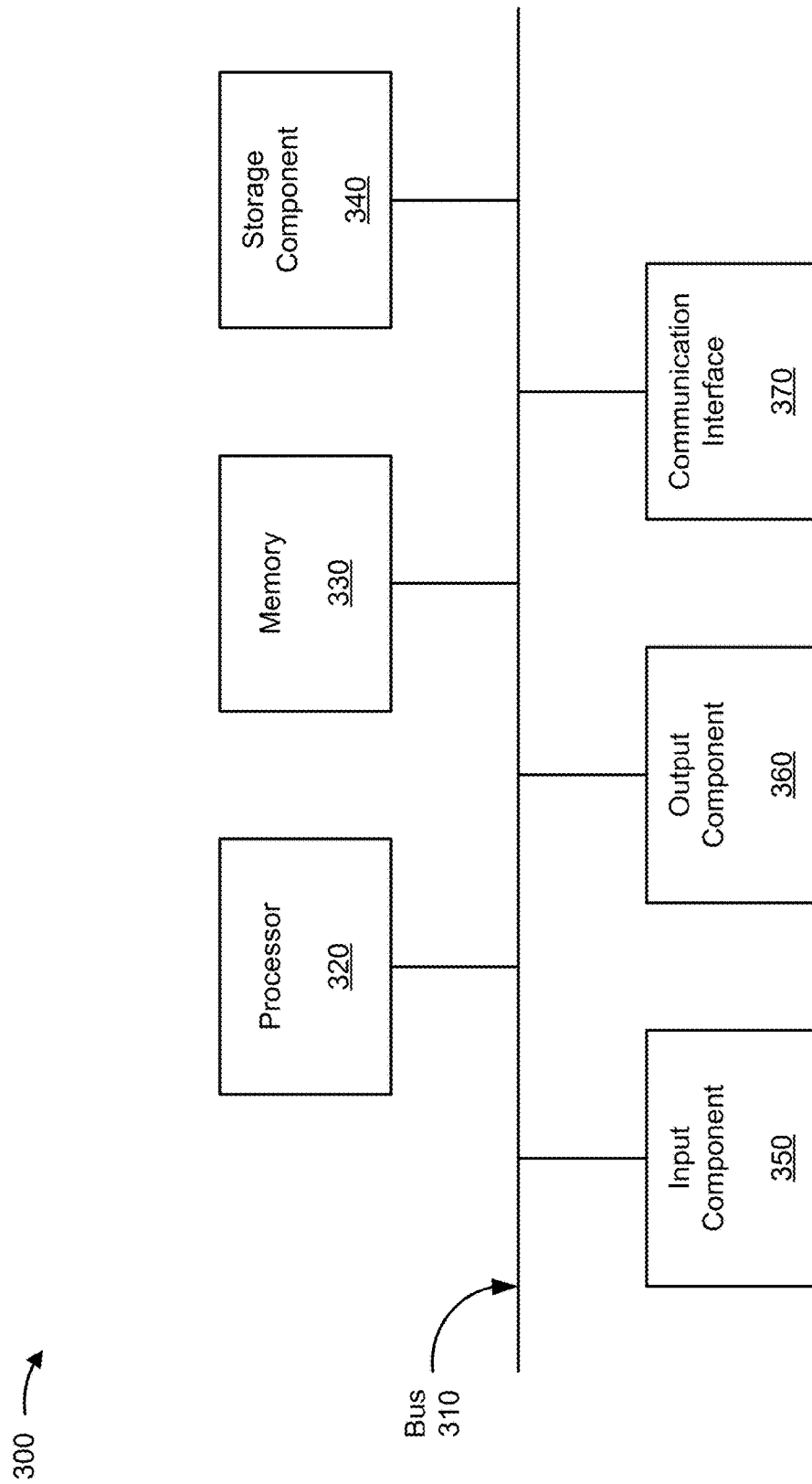
FIG. 3 is a diagram of example components of one or more devices of FIG. 2.

FIG. 3 is a diagram of example components of a device 300. Device 300 may correspond to client device 205, risk analysis platform 210, computing resource 215, and server device 225. In some implementations, client device 205, risk analysis platform 210, computing resource 215, and/or server device 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for identifying hidden fraudulent patterns on a multi-level network structure. In some implementations, one or more process blocks of FIG. 4 may be performed by risk analysis platform 210. In some implementations, one or more process blocks of FIG. 4 may be performed by another device or a group of devices separate from or including risk analysis platform 210, such as client device 205 or server device 225.

As shown in FIG. 4, process 400 may include receiving a plurality of data objects from a plurality of sources, the plurality of data objects identifying values relating to a plurality of entities for which one or more risk indicators are to be determined (block 410). For example, risk analysis platform 210 may receive one or more data objects from one or more sources. The data objects may identify values associated with one or more entities for which one or more risk indicators are to be determined by risk analysis platform 210. In some implementations, risk analysis platform 210 may receive a large quantity of data objects (e.g., millions, billions, trillions, etc.), and may use various big data techniques to process such a large quantity of data objects. This may enable analysis of larger volumes of data than is possible for a human actor.

In some implementations, a data object may include information identifying values associated with one or more entities. For example, a data object may include a document, a financial record, prescription information, configuration information, a system log, plain text information, an audio file, a video file, and/or any other type of information that may be processed by risk analysis platform 210.

In some implementations, risk analysis platform 210 may receive a data object from an entity associated with the data object. For example, client device 205 or server device 225 may automatically provide log information, configuration information, or the like, to risk analysis platform 210. In this way, risk analysis platform 210 may automatically receive or obtain data objects from client device 205 and/or server device 225, which reduces reliance on human input of such information.

In some implementations, risk analysis platform 210 may receive a data object associated with a particular entity. For example, when an entity is a doctor, a data object may include a treatment note, a prescription written by the doctor, a document identifying patients treated by the doctor, or the like. As another example, when an entity is an insurance adjuster, a data object may include a document identifying adjustments performed, a vehicle history, vehicle assessment information, or the like.

In some implementations, a data object may include user generated content, such as a document, a webpage, a weblog post, a social media account post, an email, an image file, an audio file, a video file, or the like. Additionally, or alternatively, a data object may include a resource identifier (e.g., a uniform resource identifier (URI), a uniform resource locator (URL), a uniform resource name (URN), a network address, a database address, or the like).

Additionally, or alternatively, a data object may be associated with a particular file type and/or format (e.g., a hypertext markup language (HTML) file, an extensible markup language (XML) file, a text file, a joint photographic experts group (JPEG) file, a portable network graphics (PNG) file, a motion photographic experts group (MPEG) file, an audio video interleave (AVI) file, a portable document format (PDF) file, a spreadsheet file, a word processing file, or the like). Additionally, or alternatively, a data object may include a resource associated with a particular source (e.g., a user that generated the information, a device that stores the resource, or the like).

In some implementations, risk analysis platform 210 may receive, from client device 205, the data objects and/or a memory location at which the data objects are stored. Additionally, or alternatively, risk analysis platform 210 may perform a technique (e.g., a web crawling technique, a web scraping technique, a data mining technique, a web searching technique, a database searching technique, or the like), and receive data objects to be processed based on the technique. As an example, risk analysis platform 210 may receive information that identifies a resource identifier, and obtain information to be processed based on the resource identifier (e.g., may access a resource using the resource identifier, may request a resource using the resource identifier, or the like). As another example, risk analysis platform 210 may receive information that identifies a data object and may obtain information regarding entities associated with the data object (e.g., an entity that generated the data object, entities that are associated with the entity that generated the data object, entities that have interacted with the data object, and/or the like).

In some implementations, a data object may be associated with location data. For example, the location data may include one or more location indicators, such as information that identifies a geographic location associated with a computing device that generated the information, a geographic location that is assigned to the data object, a geographic location described by or identified in the data object, a geographic location associated with a user that generated the data object, or the like. In some implementations, the location data may be provided by an entity that generated the data object. Additionally, or alternatively, the location data may be determined automatically by server device 225 (e.g., server device 225 that stores information regarding the data object) and/or client device 205 (e.g., client device 205 that receives user input regarding the data object) by analyzing or otherwise processing the data object.

In some implementations, risk analysis platform 210 may receive data from the plurality of data objects, such as the text data, the image data, the video data, the audio data, the location data, and/or the like. Additionally, or alternatively, risk analysis platform 210 may standardize the received data. For example, risk analysis platform 210 may standardize the plurality of data objects based on receiving the plurality of data objects and/or based on receiving the data from the plurality of data objects. In some implementations, risk analysis platform 210 may standardize the data objects and/or the received data to prepare the received data for processing. As an example, risk analysis platform 210 may standardize information associated with different sources, content types, file types, and/or formats, such that the information is represented in association with a particular file type and/or particular format.

In some implementations, risk analysis platform 210 may identify a file type and/or format associated with the data object, and determine a technique to standardize the data object based on the file type and/or format. For example, risk analysis platform 210 may implement a text parsing technique, an object recognition technique, an image processing technique, an image captioning technique, an audio conversion technique, a natural language processing technique, a video captioning technique, or the like, based on a file type and/or format of the data object.

In some implementations, risk analysis platform 210 may standardize the information such that the information includes a common format of data, such as text. For example, assume that risk analysis platform 210 receives data objects associated with an entity based on a user account. In this case, risk analysis platform 210 may receive information, such as text information, audio information, image information, video information, or the like. Risk analysis platform 210 may perform one or more techniques on the information to create and/or format the information into the common format of data.

In some implementations, risk analysis platform 210 may prepare the text for processing by adjusting characters in the text, such as by removing characters, replacing characters, adding characters, adjusting a font, adjusting formatting, adjusting spacing, removing white space, or the like. For example, risk analysis platform 210 may replace multiple spaces with a single space, insert a space after a left parenthesis, a left brace, a left bracket, etc., and/or insert a space before a right parenthesis, a right brace, a right bracket, etc. In this way, risk analysis platform 210 may use a space delimiter to more easily parse the text, thereby conserving processor and/or memory resources of risk analysis platform 210. In some implementations, risk analysis platform 210 may further prepare the text for processing by expanding acronyms in the text, determining terms in the text (e.g., by determining characters identified by one or more delimiting characters), associating part-of-speech tags (POS tags) with terms in the text, or the like.

By obtaining the data objects from multiple, different sources, risk analysis platform 210 may construct a multi-level analytical record. The multi-level analytical record may identify relationships between entities and/or relationships between values of data objects associated with the entities. For example, the multi-level analytical record may include a relational database that identifies relationships between the entities and/or values, as described in more detail below. The multi-level analytical record may allow insights regarding risk that is distributed among multiple, different entities, which may be difficult for a human to determine using the data objects.

As further shown in FIG. 4, process 400 may include processing the plurality of data objects to generate an analytical record (block 420). For example, risk analysis platform 210 may process the data objects to generate an analytic record based on the data objects. In some implementations, the analytical record may identify entities, and may include information obtained from the data objects. The information obtained from the data objects may be associated with the entities.

In some implementations, the analytical record may be a multi-level analytical record. For example, the analytical record may identify values of multiple, different data objects associated with a particular entity. As another example, when information regarding the particular entity is included in multiple, different data objects, risk analysis platform 210 may generate an analytical record that identifies the information, sources of the information (e.g., the multiple, different data objects), and/or relationships between the sources. In this way, risk analysis platform 210 determines a multi-level analytical record based on information from multiple, different data objects, which enables more comprehensive analysis of a group of entities to identify risky behavior. In some implementations, the analytical record may include a relational database. In such a case, the analytical record may include demographic information, key performance indicators, or the like. In some implementations, values of the analytical record may be linked to each other based on a relational table. For example, respective values of the analytical record associated with a particular patient may be linked to each other based on the relational table.

In some implementations, risk analysis platform 210 may determine relationships between entities and/or information of the analytical record based on shared values between the entities or information. For example, when two entities are associated with transactions at a particular location on a particular day, risk analysis platform 210 may identify a relationship between the two entities, and may add information identifying the relationship to the analytical record (e.g., based on a relational database approach). Additionally, or alternatively, risk analysis platform 210 may determine relationships between entities and/or values of the analytical record based on information identifying preexisting relationships between entities, as described below.

Using the multi-level analytical record in this way may enable risk analysis platform 210 to make inferences about an entity based on multiple, different data objects, which improves the versatility of risk analysis platform 210 and/or enables identification of risky behavior by multiple, different entities. Further, using the multi-level analytical record in this way may enable risk analysis platform 210 to limit information loss that may be caused by aggregation of data at an entity level. For example, by preserving relationships between data associated with different entities, risk analysis platform 210 may perform risk detection based on respective interactions between entities.

In some implementations, risk analysis platform 210 may generate the analytical record based on natural language processing. For example, risk analysis platform 210 may use natural language processing to determine computer-usable information from a natural language data set. In some implementations, a data object may include natural language (e.g., chat logs, news articles, journal entries, description of patient conditions, or the like). In some implementations, risk analysis platform 210 may perform natural language processing to identify values of the data objects, and may add the values to the analytical record (e.g., using fuzzy matching of textual information and/or the like). Using natural language processing in this way enables risk analysis platform 210 to perform large scale analysis of textual data, and conserve resources that would otherwise be used for manual determination of the analytical record based on the textual data objects.

In some implementations, risk analysis platform 210 may generate the analytical record based on relationship information identifying preexisting relationships between entities and/or data objects. For example, risk analysis platform 210 may identify a relationship between two entities based on the relationship information, and may process information of data objects associated with the two entities accordingly. As a more particular example, assume that a medical professional provides treatment to a group of patients. In such a case, risk analysis platform 210 may receive information indicating that the medical professional treats the group of patients, and may configure the analytical record so that interactions by the group of patients with the medical professional are identified. Thus, risk analysis platform 210 may generate an analytical record based on preexisting relationships between entities, which enables identification of patterns of risky behavior.

As further shown in FIG. 4, process 400 may include determining one or more risk indicators based on the analytical record, one or more tests, and/or risk contribution score(s) of the plurality of entities (block 430). For example, risk analysis platform 210 may determine one or more risk indicators based on the analytical record, one or more tests, and/or one or more risk contribution scores associated with the one or more entities. In some implementations, a risk indicator may identify a likelihood of fraud or predicted probability of occurrence of a particular risk, behavior, and/or condition. For example, the risk indicator may indicate a probability of occurrence of fraudulent behavior by one or more entities. As another example, the risk indicator may identify a configuration of one or more client devices 205 that is unsafe or insecure. In some implementations, a risk contribution score may identify contributions of one or more entities to a particular risk. For example, where multiple entities are involved in fraudulent behavior, the multiple entities may be associated with respective risk contribution scores identifying levels of contribution of the multiple entities, and a highest risk contribution score may identify a central entity (e.g., a ringleader, an entity associated with a highest risk or a highest probability of risk, or the like).

In some implementations, risk analysis platform 210 may determine the risk indicator and/or a risk contribution score based on one or more expected values associated with data objects. For example, risk analysis platform 210 may receive review information identifying expected values of data objects. An example of review information in a medical context may include information that may identify appropriate medication and dosages based on weight, sex, disease, or the like. An example of review information in an IT context may include device manuals, best practices instructions, information identifying previous resolutions of problems, or the like. An example of review information in an insurance context may include standardized tables of car assessment values.

In some implementations, risk analysis platform 210 may use the expected values of the data objects to determine the risk indicator and/or risk contribution score. For example, risk analysis platform 210 may increase a risk indicator or a risk contribution score when an observed value associated with a data object does not match an expected value of the data object. Additionally, or alternatively, risk analysis platform 210 may determine a level of deviation from the expected value of the data object (e.g., based on natural language processing, regression analysis, and/or the like), and may determine the risk indicator based on the level of deviation. When the level of deviation increases, risk analysis platform 210 may increase the risk indicator. Additionally, or alternatively, risk analysis platform 210 may use a natural language processing approach to determine the level of deviation. For example, risk analysis platform 210 may use a fuzzy matching process to determine similarity of the observed value and the expected value, which reduces human input, eliminates human subjectivity, and allows processing of large quantities of samples (e.g., millions, billions, and/or the like) using a rigorous and well-defined approach.

In some implementations, risk analysis platform 210 may determine the risk indicator and/or a risk contribution score for a data object based on a peer group analysis test. For example, risk analysis platform 210 may analyze a group of data objects to determine whether a behavior of a particular data object is typical of the behavior of other data objects in a peer group associated with the data objects. When the behavior of the particular data object is not typical, risk analysis platform 210 may determine that the particular data object is an outlier of the peer group of data objects.

In some implementations, risk analysis platform 210 may utilize a set of models to analyze different risk indicators for the data objects. Based on the i-th model in the set of models, risk analysis platform 210 may determine a probability of fraud $p_i^{PG}$ for each analyzed risk indicator. In some implementations, a risk indicator and/or risk contribution score may be higher for entities that are more significant outliers from a peer group. In some implementations, a peer group may be based on an entity type, similar behavior of entities, predefined relationships between entities, or the like. Using peer group analysis in this way may allow risk analysis platform 210 to identify risk indicators without historical knowledge of the risk indicators. Further, using peer group analysis in this way may allow risk analysis platform 210 to identify outlier entities and risk indicators based on the fact that the entities are outlier entities.

In some implementations, risk analysis platform 210 may determine the risk indicator and/or a risk contribution score for a data object based on a break point analysis test. For example, risk analysis platform 210 may analyze a particular entity to identify changes in the behavior of the particular entity during a period of time. In some implementations, risk analysis platform 210 may compare a current behavior of the particular entity to a past behavior of the particular entity. For example, risk analysis platform 210 may use multiple models to analyze different key point indicators (KPIs) of the entity behavior. In some implementations, risk analysis platform 210 may utilize a set of models to analyze different risk indicators for the particular entity. Based on the j-th model in the set of models, risk analysis platform 210 may determine a probability of fraud $p_j^{BP}$ for each analyzed risk indicator. For example, risk analysis platform 210 may determine that drastic changes in break points in the j-th model may indicate a high probability of fraud. Using break point analysis in this way allows risk analysis platform 210 to identify risk indicators based on changing behavior of a single entity, which may be useful when other rules or tests for identifying risk indicators are not known or implemented by risk analysis platform 210. In other words, risk analysis platform 210 may not need to tailor break point analysis to a particular environment that is being tested for risk indicators.

In some implementations, risk analysis platform 210 may determine a risk indicator and/or a risk contribution score using a regression analysis test (e.g., linear regression, quadratic regression, logistic regression, multiple regression, or the like). For example, risk analysis platform 210 may use a set of independent variables (i.e., values of the analytical record) and a model to determine a value of a dependent variable (i.e., a risk indicator). In some implementations, risk analysis platform 210 may determine the model based on historical information. For example, risk analysis platform 210 may determine the model based on machine learning. In some implementations, risk analysis platform 210 may use known inputs and known outputs to determine coefficients based on a relationship between the inputs and outputs, and then use coefficients to process other inputs to determine new outputs. In some implementations, risk analysis platform 210 also may update the model based on comparing new outputs to observed values to determine if the new outputs are accurate. Using machine learning in this way, risk analysis platform 210 automatically updates coefficients of the model, thereby improving accuracy of the model.

In some implementations, risk analysis platform 210 may determine risk indicators using multiple, different tests (e.g., a peer group analysis test, a break point analysis test, and an expected value test). For example, risk indicators may be determined using $$p = \sum_{i \in I} \alpha_i p_i^{PG} + \sum_{j \in J} \beta_j p_j^{BP} + \delta p^{EV}$$

where p represents a joint risk probability/score, $p_i^{PG}$ represents the probability of risk from the i-th peer group model, $p_j^{BP}$ represents the probability of risk from the j-th break point model, $p^{EV}$ represents the probability of risk from the expected value test, and $\Sigma_{i \in I} \alpha_i + \Sigma_{j \in J} \beta_j + \delta = 1$. In some implementations, risk analysis platform 210 may adjust the coefficients $\alpha$, $\beta$, and $\delta$ based on an algorithm, such as a machine learning algorithm. In some implementations, risk analysis platform 210 may select one or more tests to perform based on respective variances associated with respective outputs of the one or more tests. For example, risk analysis platform 210 may reject tests associated with a variance that satisfies a threshold (e.g., a variance that is too high) since such tests may not provide useful information.

In some implementations, risk analysis platform 210 may determine a risk contribution score of a particular entity based on risk indicators of related entities. In some implementations, risk analysis platform 210 may identify the related entities based on interactions between the particular entity and the related entities, or based on hierarchical information identifying a relationship between the particular entity and the related entities. Additionally, or alternatively, risk analysis platform 210 may determine a risk contribution score based on risk indicators of the related entities using a graph data structure. For example, risk analysis platform 210 may associate related entity relationships with weights, and may combine risk indicators of the related entities and the particular entity based on the weights to determine a risk contribution score of the particular entity. In some implementations, a highest risk contribution score of a group of entities may identify an entity with a highest risk of the group (e.g., a ringleader, an entity associated with riskiest behavior, an entity associated with related entities that are associated with risky behavior, and/or the like).

In some aspects, risk analysis platform 210 may select one or more tests based on which to determine a risk indicator and/or a risk contribution score. For example, risk analysis platform 210 may select the one or more tests based on respective variances of outputs of a test with regard to a group of entities. When the variances of the outputs satisfy a threshold (e.g., when the variances are too high), risk analysis platform 210 may determine that the test is producing inconsistent results, and may determine not to use the test to determine the risk indicator. In this way, risk analysis platform 210 improves accuracy of determination of risk indicator by selecting tests based on variances associated with the tests.

As further shown in FIG. 4, process 400 may include performing an action based on the one or more risk indicators (block 440). For example, risk analysis platform 210 may perform an action based on the risk indicators. In some implementations, risk analysis platform 210 may provide information identifying the risk indicators and/or the entities associated with the risk indicators (e.g., to an investigator, an administrator, or the like). Additionally, or alternatively, risk analysis platform 210 may notify an entity that the entity is engaging in risky behavior. Additionally, or alternatively, risk analysis platform 210 may activate or deactivate one or more client devices 205 that may be associated with a risky configuration. Additionally, or alternatively, risk analysis platform 210 may reconfigure a client device 205 to mitigate the risk. Additionally, or alternatively, risk analysis platform 210 may provide a notification to law enforcement or a similar entity with jurisdiction in an area associated with a risky behavior pattern. Additionally, or alternatively, risk analysis platform 210 may provide a notification to a supervisor or a company associated with a group of entities associated with a risky behavior pattern. Additionally, or alternatively, risk analysis platform 210 may perform a combination of the above actions and/or another action not described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, risk analysis platform 210 may determine a risk indicator based on a multi-level analytical record and based on relationships between entities, which may enable identification of patterns of risky behavior between multiple, different entities. In some implementations, the analytical record may be generated based on various big data analytical approaches, which may permit processing of large volumes of data in a fashion that may be difficult or impossible for a human actor, and which eliminates subjectivity of the human actor. Still further, risk analysis platform 210 may determine the risk indicator using one or more unsupervised tests (e.g., break point analysis, peer group analysis, etc.), which may not require human supervision and may not require calibration or configuration using historical data.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. One or more devices, comprising:
one or more memories,
one or more processors, communicatively coupled to the one or more memories, to:
receive data associated with a plurality of data objects from a plurality of computing resources,
the plurality of computing resources being connected via a computer network,
the plurality of computing resources including one or more applications,
the plurality of data objects identifying values relating to a plurality of entities for which a security risk indicator is to be determined,
the plurality of data objects being associated with user generated content including one or more of:
a document,
a webpage,
a weblog post,
a social media account post,
an email,
an image file,
an audio file, or
a video file,
the plurality of entities being associated with one or more computing resources, of the plurality of computing resources;
process the plurality of data objects to generate a multi-level analytical record,
the multi-level analytical record identifying relationships between respective values of different data objects of the plurality of data objects, and
the multi-level analytical record being based on one or more types of entities associated with the plurality of entities, the plurality of data objects, and one or more hierarchical relationships between the plurality of entities;
determine the security risk indicator based on the multi-level analytical record,
the security risk indicator corresponding to one or more entities of the plurality of entities, and
the security risk indicator being determined based on one or more tests including at least one of:
a comparison between the multi-level analytical record and a data structure that identifies expected values of one or more data objects of the plurality of data objects,
an identification of a group of entities, of the plurality of entities, and an outlier from the group of entities based on the multi-level analytical record, or
an identification of a change in behavior of the one or more entities based on the multi-level analytical record;
identify a security risk contribution score for a particular entity, of the plurality of entities, based on the security risk indicator and frequency of interactions with related entities,
the security risk contribution score indicating that the particular entity is a central entity in a risky behavior pattern associated with the related entities,
the central entity being associated with a highest security vulnerability compared to other entities, of the plurality of entities; and
automatically perform, based on identifying the security risk contribution score, a remediation action,
the remediation action including at least one of:
deactivating the particular entity,
performing a security process with regard to the particular entity,
reconfiguring the particular entity, or
blocking the other entities from interacting with the particular entity.

2. The one or more devices of claim 1, where the identification of the change in the behavior of the one or more entities is based on a change in a value associated with the one or more entities satisfying a threshold.

3. The one or more devices of claim 1, where selecting the one or more tests further comprises:
identifying a test, of a plurality of tests other than the one or more tests, that is not to be used to determine the security risk indicator,
the test being identified based on the test having a higher variance than the one or more tests or based on a variance of the test satisfying a threshold.

4. The one or more devices of claim 1, where the security risk indicator relates to at least two entities of the plurality of entities.

5. A method, comprising:
receiving, by a device, data associated with a plurality of data objects from a plurality of computing resources,
the plurality of computing resources being connected via a computer network,
the plurality of computing resources including one or more applications,
the plurality of data objects identifying values relating to a plurality of entities for which a security risk indicator is to be determined,
the plurality of data objects being associated with user generated content including one or more of:
a document,
a webpage,
a weblog post,
a social media account post,
an email,
an image file,
an audio file, or
a video file, and
the plurality of entities being associated with one or more computing resources, of the plurality of computing resources;
processing, by the device, the plurality of data objects to generate a multi-level analytical record,
the multi-level analytical record identifying relationships between respective values of different data objects of the plurality of data objects, and
the multi-level analytical record being based on one or more types of entities associated with the plurality of entities, the plurality of data objects, and one or more hierarchical relationships between the plurality of entities;
determining, by the device, the security risk indicator based on the multi-level analytical record,
the security risk indicator identifying a probability of occurrence of a condition with regard to one or more entities of the plurality of entities, and
the security risk indicator being determined based on one or more tests including at least one of:
a comparison between the multi-level analytical record and a data structure that identifies expected values of one or more data objects of the plurality of data objects,
an identification of a group of entities, of the plurality of entities, and an outlier from the group of entities based on the multi-level analytical record, or
an identification of a change in behavior of the one or more entities based on the multi-level analytical record;
identifying, by the device, a security risk contribution score for a particular entity, of the plurality of entities, based on the security risk indicator and frequency of interactions with related entities,
the security risk contribution score indicating that the particular entity is a central entity in a risky behavior pattern associated with the related entities,
the central entity being associated with a highest security vulnerability compared to other entities, of the one or more entities; and
automatically performing, by the device and based on identifying the security risk contribution score, a remediation action,
the remediation action including at least one of:
deactivating the particular entity,
performing a security process with regard to the particular entity,
reconfiguring the particular entity, or
blocking the other entities from interacting with the particular entity.

6. The method of claim 5,
where the security risk indicator is determined based on respective security risk contribution scores associated with the other entities of the one or more entities,
the respective security risk contribution scores being determined based on the one or more tests,
the one or more tests including at least one of:
a break point analysis test,
a peer group analysis test,
a regression analysis test, or
a decision tree analysis test, and
the respective security risk contribution scores identifying levels of contribution of the other entities to a risky behavior pattern associated with the particular entity.

7. The method of claim 6, where the other entities are associated with respective interactions with the particular entity,
the respective security risk contribution scores being determined based on the respective interactions.

8. The method of claim 6, where the other entities are associated with respective security risk indicators,
the security risk indicator associated with the particular entity having a value higher than values of the respective security risk indicators.

9. The method of claim 5, where the relationships between the respective values are based on predefined relationships between corresponding entities of the plurality of entities.

10. The method of claim 9, where the security risk indicator relates to at least two entities of the plurality of entities,
the at least two entities being associated with different hierarchical levels based on the predefined relationships.

11. The method of claim 5, where the security risk indicator identifies a likelihood of fraud perpetrated by the one or more entities.

12. A non-transitory computer-readable medium storing instructions, the instructions comprising:
one or more instructions that, when executed by one or more processors, cause the one or more processors to:
receive data associated with a plurality of data objects from a plurality of computing resources,
the plurality of computing resources being connected via a computer network,
the plurality of computing resources including one or more applications,
the plurality of data objects identifying values relating to a plurality of entities for which a security risk indicator is to be determined,
the plurality of data objects being associated with user generated content including one or more of:
a document,
a webpage,
a weblog post,
a social media account post,
an email, an image file,
an audio file, or
a video file, and
the plurality of entities being associated with one or more computing resources, of the plurality of computing resources;
process the plurality of data objects to generate a multi-level analytical record,
the multi-level analytical record identifying relationships between respective values of different data objects of the plurality of data objects, and
the multi-level analytical record being based on one or more types of entities associated with the plurality of entities, the plurality of data objects, and one or more hierarchical relationships between the plurality of entities;
determine the security risk indicator based on the multi-level analytical record,
the security risk indicator identifying a probability of occurrence of a condition with regard to one or more entities of the plurality of entities, and
the security risk indicator being determined based on one or more tests including at least one of:
a comparison between the multi-level analytical record and a data structure that identifies expected values of one or more objects of the plurality of data objects,
an identification of a group of entities, of the plurality of entities, and an outlier from the group of entities based on the multi-level analytical record, or
an identification of a change in behavior of the one or more entities based on the multi-level analytical record;
identify a security risk contribution score for a particular entity, of the plurality of entities, based on the security risk indicator and frequency of interactions with related entities,
the security risk contribution score indicating that the particular entity is a central entity in a risky behavior pattern associated with the related entities,
the central entity being associated with a highest security vulnerability compared to other entities, of the plurality of entities; and
automatically perform, based on identifying the security risk contribution score, a remediation action,
the remediation action including at least one of:
deactivating the particular entity,
performing a security process with regard to the particular entity,
reconfiguring the particular entity, or
blocking the other entities from interacting with the particular entity.

13. The non-transitory computer-readable medium of claim 12,
where the security risk indicator is determined based on respective security risk indicators associated with other entities of the one or more entities,
the respective security risk indicators being determined based on the one or more tests.

14. The non-transitory computer-readable medium of claim 12, where the security risk indicator identifies a likelihood of fraud perpetrated by the one or more entities.

15. The non-transitory computer-readable medium of claim 12,
where the security risk indicator is determined based on respective security risk contribution scores associated with other entities of the one or more entities,
the respective security risk contribution scores being determined based on the one or more tests, and
the respective security risk contribution scores identifying levels of contribution of the other entities to a risky behavior pattern associated with the particular entity.

16. The device of claim 1, where the central entity is determined based on:
the security risk contribution score associated with the particular entity satisfying a threshold,
the security risk contribution score associated with the particular entity being a highest contribution score when compared with the related entities, or
the security risk contribution score associated with the particular entity being higher than the security risk contribution scores associated with the related entities by a threshold amount.

17. The method of claim 5, where the central entity is determined based on:
the security risk contribution score associated with the particular entity satisfying a threshold,
the security risk contribution score associated with the particular entity being a highest contribution score when compared with the related entities, or
the security risk contribution score associated with the particular entity being higher than the security risk contribution scores associated with the related entities by a threshold amount.

18. The non-transitory computer-readable medium of claim 12, where the central entity is determined based on:
the security risk contribution score associated with the particular entity satisfying a threshold,
the security risk contribution score associated with the particular entity being a highest contribution score when compared with the related entities, or
the risk contribution score associated with the particular entity being higher than the security risk contribution scores associated with the related entities by a threshold amount.

19. The one or more devices of claim 1, where the one or more processors are further to:
standardize, using a data technique, the plurality of data objects and/or the data received from the plurality of data objects to prepare the received data for processing,
where the data technique includes at least one of:
a text parsing technique,
an object recognition technique,
an image processing technique,
an image captioning technique,
an audio conversion technique,
a natural language processing technique, or
a video captioning technique.

20. The non-transitory computer-readable medium of claim 12, where the one or more instructions, when executed by the one or more processors, further cause the one or more processors to:
standardize, using a data technique, the plurality of data objects and/or the data received from the plurality of data objects to prepare the received data for processing,
where the data technique includes at least one of:
a text parsing technique,
an object recognition technique,
an image processing technique,
an image captioning technique,
an audio conversion technique, a natural language processing technique, or a video captioning technique.

\* \* \* \* \*